United States Patent
Yuasa

(10) Patent No.: US 10,247,350 B2
(45) Date of Patent: Apr. 2, 2019

(54) SEALED CONTAINER, THERMAL INSULATOR, AND GAS ADSORPTION DEVICE

(71) Applicant: Panasonic Intellectual Property Management Co., Ltd., Osaka (JP)

(72) Inventor: Akiko Yuasa, Kyoto (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 103 days.

(21) Appl. No.: 15/311,453

(22) PCT Filed: May 12, 2015

(86) PCT No.: PCT/JP2015/002395
§ 371 (c)(1),
(2) Date: Nov. 15, 2016

(87) PCT Pub. No.: WO2015/177984
PCT Pub. Date: Nov. 26, 2015

(65) Prior Publication Data
US 2017/0082236 A1 Mar. 23, 2017

(30) Foreign Application Priority Data
May 22, 2014 (JP) .................................. 2014-105864

(51) Int. Cl.
*B01D 53/02* (2006.01)
*F16L 59/065* (2006.01)
(Continued)

(52) U.S. Cl.
CPC ............ *F16L 59/065* (2013.01); *B01D 53/04* (2013.01); *B01D 53/0407* (2013.01);
(Continued)

(58) Field of Classification Search
CPC ........ B01D 2253/102; B01D 2253/106; B01D 2253/108; B01D 2253/25;
(Continued)

(56) References Cited

U.S. PATENT DOCUMENTS

| 5,544,490 A | 8/1996 | Manini et al. |
| 5,600,957 A | 2/1997 | Manini et al. |

(Continued)

FOREIGN PATENT DOCUMENTS

| CN | 1151790 A | 6/1997 |
| JP | 9-512088 | 12/1997 |

(Continued)

OTHER PUBLICATIONS

International Search Report of PCT application No. PCT/JP2015/002395 dated Jul. 7, 2015.
The Extended European Search Report dated May 2, 2017 for the related European Patent Application No. 15796092.3, 8 pages.
(Continued)

*Primary Examiner* — Christopher P Jones
(74) *Attorney, Agent, or Firm* — Hamre, Schumann, Mueller & Larson, P.C.

(57) ABSTRACT

A sealed container (1) includes at least an outer container (2) and a gas adsorption device (4) being provided in a sealed space (3) within the outer container (2) and being capable of adsorbing a gas. The gas adsorption device (4) includes at least a copper ion-exchanged ZSM-5 type zeolite and a primary material having a lower gas barrier property than the outer container (2) does.

2 Claims, 4 Drawing Sheets

(51) Int. Cl.
  *B01J 20/18* (2006.01)
  *B01D 53/04* (2006.01)
  *B01D 53/26* (2006.01)
(52) U.S. Cl.
  CPC ............ *B01D 53/261* (2013.01); *B01J 20/18* (2013.01); *B01D 2253/102* (2013.01); *B01D 2253/106* (2013.01); *B01D 2253/108* (2013.01); *B01D 2253/25* (2013.01); *B01D 2257/102* (2013.01); *B01D 2257/80* (2013.01); *B01D 2259/4525* (2013.01)
(58) Field of Classification Search
  CPC .......... B01D 2257/102; B01D 2257/80; B01D 2259/2425; B01D 53/04; B01D 53/0407; B01D 53/261; B01J 20/18; F16L 59/065
  See application file for complete search history.

(56) References Cited

U.S. PATENT DOCUMENTS

2009/0090242 A1   4/2009   Hashida et al.
2013/0306655 A1   11/2013  Takushima et al.

FOREIGN PATENT DOCUMENTS

| JP | 2008-056317   | 3/2008 |
| JP | 2009-078261   | 4/2009 |
| JP | 2009-138890 A | 6/2009 |
| JP | 2011-092827   | 5/2011 |

OTHER PUBLICATIONS

English Translation of Chinese Search Report dated Mar. 5, 2018 for the related Chinese Patent Application No. 201580025254.1.

SEALED CONTAINER, THERMAL INSULATOR, AND GAS ADSORPTION DEVICE

TECHNICAL FIELD

The present invention relates to a sealed container, a thermal insulator, and a gas adsorption device that is applied to the sealed container and the thermal insulator.

BACKGROUND ART

Generally, in a sealed container or a thermal insulator that delivers performance by a high degree of vacuum environment or an inert gas atmosphere having a high purity, such as in a vacuum thermally insulating container, a vacuum thermal insulator, or a plasma display panel, an internal pressure rise brought about by a gas remaining at a time of production or a gas penetrating with lapse of time constitutes a cause of deterioration of the performance of the sealed container or the thermal insulator. Thus, in order to adsorb these gases, a sealed gas adsorption device filled with a gas adsorption material is proposed.

For example, numerous gas adsorption devices are proposed that are applied to a vacuum thermal insulator formed by covering a core material with an outer covering material having a gas barrier property and reducing a pressure of an inside of the outer covering material and that include a gas-adsorptive substance capable of adsorbing an air component, particularly nitrogen which is a hardly adsorbable gas.

These gas adsorption devices have a function of adsorbing and removing a residual gas that is present in an inside of the outer covering material and that has not been removed by an industrial vacuum gas-discharging step, thereby improving thermally insulating performance. However, there is a problem that, when these gas adsorption devices are brought into contact with air before being applied to the thermal insulator, the gas-adsorptive substance adsorbs the air component and the like, and thus a part of the gas-adsorptive substance is consumed.

In addition, in many cases, the gas-adsorptive substance has a property of adsorbing moisture together with the air component. For this reason, an attempt is made to find how moisture adsorption can be suppressed so as to make the gas-adsorptive substance adsorb a large volume of the air component.

For example, as a device for maintaining vacuum within a thermally insulating jacket, there is proposed a device in which an upper-part open container formed of a gas-impermeable material is filled with a Ba—Li alloy exhibiting reactivity to a gas such as nitrogen even at room temperature, and further a dry material powder is disposed in an upper part of the container so as to cover the Ba—Li alloy (see, for example, PTL 1).

This device allows that, because the dry material powder is disposed, moisture adsorption of the Ba—Li alloy is suppressed, and thus consumption of the Ba—Li alloy by moisture adsorption can be suppressed.

In addition, there is proposed a container incorporating a gas adsorption material, having an outer periphery that covers the gas adsorption material and a communication part that does not bring an inside and an outside of the outer periphery into communication with each other when an external force is not applied yet, but brings the inside and the outside of the outer periphery into communication with each other when a predetermined external force is applied (see, for example, PTL 2).

This container prevents the gas adsorption material from being exposed to air and the like by action of the outer periphery. In addition, at a time of use, the inside and the outside of the outer periphery can be brought into communication with each other by application of the external force, and thus gas adsorption can be started. For this reason, this container can suppress consumption of the gas adsorption material, and thus a high adsorption capability can be retained in an arbitrary environment of use.

In addition, there is proposed a gas adsorption device including a gas adsorption material, a barrier container that covers the gas adsorption material, and an air-permeable but hardly moisture-permeable film that covers the barrier container (see, for example, PTL 3).

By this gas adsorption device, suppression of consumption of the gas adsorption material by contact with air can be achieved because the gas adsorption material is covered with the barrier container. Thereafter, in letting the gas in an inside of a thermally insulating material be adsorbed by forming a through-hole in the barrier container, selective adsorption of only the air from the air containing moisture can be realized because the barrier container is covered with the air-permeable but hardly moisture-permeable film. For this reason, it is possible to provide a gas adsorption device with an increased adsorption volume of intended gases other than moisture.

The device disclosed in PTL 1 has a problem that the Ba—Li alloy has a comparatively low capability to adsorb nitrogen, and the adsorption speed is slow. In addition, Ba is a PRTR (Pollutant Release and Transfer Register) designated substance, so that those without a problem to an environment or human bodies are desired for industrial use. In addition, by a structure of covering the Ba—Li alloy with the dry material powder, reach of the moisture to the Ba—Li alloy can be suppressed. However, there is a problem that, because reach of the air cannot be prevented, part of the Ba—Li alloy is consumed.

In addition, in the container disclosed in PTL 2, control of letting the inside and the outside of the container incorporating the gas adsorption material be in non-communication or communication by the external force can be made. By providing the communication at a time point when the communication is needed in an inside of the thermally insulating material, consumption of the gas adsorption material can be prevented. Meanwhile, there is a problem that this control needs the external force, that a cost for imparting a mechanism to the container is needed, and the like.

In addition, there is a problem that, when the residual gas that is present in the inside of the outer covering material and that has not been removed by the industrial vacuum gas-discharging step contains moisture, consumption of the gas adsorption material by moisture adsorption cannot be suppressed.

In addition, in the device disclosed in PTL 3, there is a need to form the through-hole in the barrier container at a time of adsorption of the gas in the inside of the thermal insulator for permeation of the gas. For this reason, there is a problem of increase in a number of manufacturing steps.

Furthermore, the gas adsorption device including the copper ion-exchanged ZSM-5 type zeolite, which is disclosed in PTL 2 and PTL 3, is characterized by having a larger gas adsorption volume and a higher adsorption speed as compared with an already existing conventional gas adsorption device. Meanwhile, in the same manner as in an already existing conventional gas adsorption material, this gas adsorption device adsorbs nitrogen, oxygen, moisture, and the like in the air to be consumed when brought into contact with the air before being applied to the thermal insulator. For this reason, this gas adsorption device has a problem of decrease in the capability to adsorb the residual air that is present in the inside of the outer covering material and that has not been removed by the industrial vacuum gas-discharging step.

CITATION LIST

Patent Literatures

PTL 1: Japanese Translation of PCT Publication No. 1109-512088
PTL 2: Unexamined Japanese Patent Publication No. 2008-56317
PTL 3: Unexamined Japanese Patent Publication No. 2011-92827

SUMMARY OF THE INVENTION

The present invention has been made in view of such conventional problems, and includes use of the gas adsorption device including the copper ion-exchanged ZSM-5 type zeolite having a good gas adsorption capability. In addition, a sealed container and a thermal insulator capable of suppressing, with a simple structure, the consumption caused by contact with air even when handled in air, as well as a gas adsorption device applied to these, are provided.

In other words, the present invention provides a sealed container including the gas adsorption device, the device being capable of suppressing consumption caused by contact with air even when handled in air, without sealing, with the barrier container or the like, the copper ion-exchanged ZSM-5 type zeolite which is a gas adsorption material.

In addition, the present invention provides a thermal insulator including the gas adsorption device, the device being capable of suppressing consumption caused by contact with air even when handled in air, without sealing, with the barrier container or the like, the copper ion-exchanged ZSM-5 type zeolite which is a gas adsorption material.

In addition, the present invention provides a gas adsorption device being capable of suppressing moisture adsorption of the copper ion-exchanged ZSM-5 type zeolite which is a gas adsorption material, and being capable of adsorbing air components in a large volume.

The sealed container of the present invention includes at least an outer container and a gas adsorption device being provided in a sealed space within the outer container and being capable of adsorbing a gas. In addition, the gas adsorption device includes at least a copper ion-exchanged ZSM-5 type zeolite and a primary material having a lower gas barrier property than the outer container does.

This allows that the gas adsorption device suppresses consumption caused by contact with air with a help of the primary material having a lower gas barrier property than the outer container does even when handled in air, and can realize gas adsorption of a large volume within the outer container. Therefore, the sealed space within the sealed container can be brought into a highly pure state due to removal of impurity gases or into a high vacuum state.

The thermal insulator of the present invention includes at least a core material and a gas adsorption device capable of adsorbing a gas, as well as an outer covering material having a gas barrier property and covering the core material and the gas adsorption device, a pressure of an inside of the outer covering material being reduced. In addition, the gas adsorption device includes at least a copper ion-exchanged ZSM-5 type zeolite and a primary material having a lower gas barrier property than the outer covering material does.

This allows that the gas adsorption device suppresses consumption caused by contact with air with a help of the primary material having a lower gas barrier property than the outer covering material does even when handled in air, and can realize gas adsorption of a large volume within the outer covering material. As a result of this, an internal pressure of the thermal insulator formed by reducing the pressure of the inside of the outer covering material can be reduced to a further higher vacuum. Therefore, a thermal insulator delivering high performance can be provided.

The present invention makes it possible to obtain a gas adsorption device capable of suppressing consumption of the copper ion-exchanged ZSM-5 type zeolite caused by contact with air even when the gas adsorption device is handled in air. As a result of this, a highly pure state due to removal of impurity gases or a high vacuum state can be realized as the sealed space within the sealed container.

In addition, the internal pressure of the thermal insulator formed by reducing the pressure of the inside of the outer covering material can be reduced to a further higher vacuum. For this reason, the thermal insulator delivering high performance can be provided.

DESCRIPTION OF EMBODIMENTS

Hereinafter, exemplary embodiments of the present invention will be described with reference to the drawings. The present invention is not limited by these exemplary embodiments.

First Exemplary Embodiment

Figure 1:
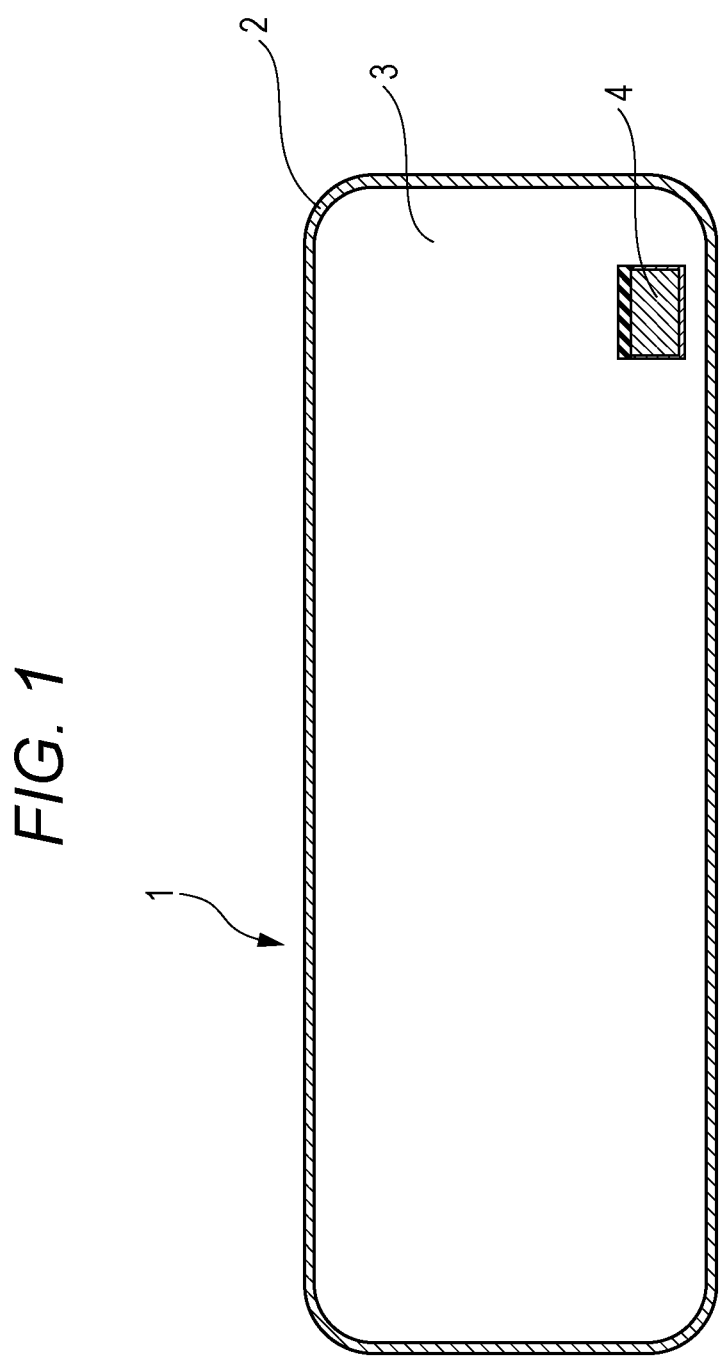
FIG. 1 is a sectional view of a sealed container in a first exemplary embodiment of the present invention.
Figure 2:
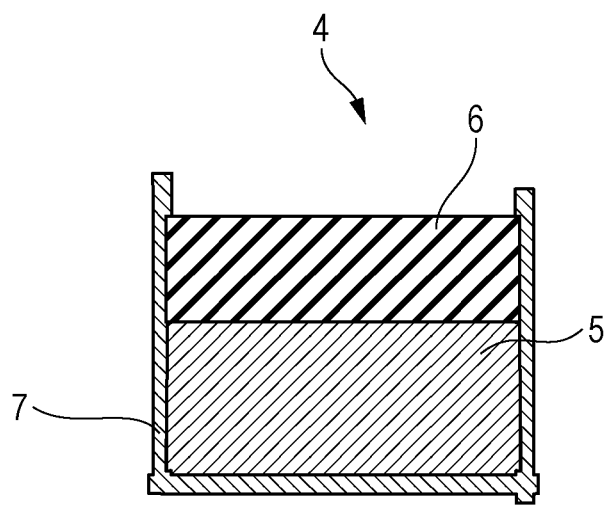
FIG. 2 is a sectional view of one example of a gas adsorption device in the first exemplary embodiment of the present invention.
Figure 3:
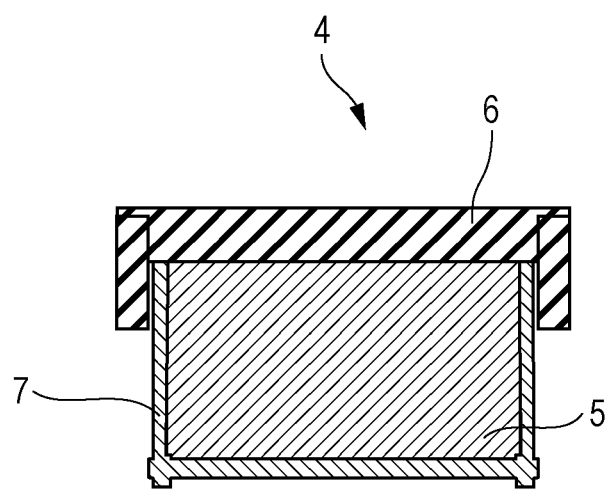
FIG. 3 is a sectional view of another example of the gas adsorption device in the first exemplary embodiment of the present invention.

FIG. 1 is a sectional view of a sealed container in a first exemplary embodiment of the present invention. FIG. 2 and FIG. 3 are sectional views of examples of a gas adsorption device in the first exemplary embodiment of the present invention.

Referring to FIG. 1, sealed container 1 of the present exemplary embodiment is made of at least outer container 2 constituting sealed container 1, sealed space 3 formed by outer container 2, and gas adsorption device 4 being provided in sealed space 3 and being capable of adsorbing a gas. Further, as shown in detail in FIG. 2, gas adsorption device 4 includes at least copper ion-exchanged ZSM-5 type zeolite 5 and primary material 6 having a lower gas barrier property than outer container 2 does.

Adsorption device 4 in FIG. 2 has a structure in which container 7 is filled with copper ion-exchanged ZSM-5 type zeolite 5 and primary material 6 having a lower gas barrier property than outer container 2 does. Referring to FIG. 3, adsorption device 4 may have a structure in which container 7 is filled with copper ion-exchanged ZSM-5 type zeolite 5, and primary material 6 having a lower gas barrier property than outer container 2 does covers an opening of container 7.

In the above structure, by covering an air-contact surface of copper ion-exchanged ZSM-5 type zeolite 5 having a large gas adsorption volume and a high gas adsorption speed with primary material 6 having a lower gas barrier property than outer container 2 does, reach of the gas is retarded even when copper ion-exchanged ZSM-5 type zeolite 5 is handled in air. For this reason, a gas adsorption device can be obtained in which consumption of copper ion-exchanged ZSM-5 type zeolite 5 by contact with air is suppressed. As a result of this, the inside of sealed container 1 can be made to have a higher vacuum. Alternatively, sealed container 1 can be provided from which a predetermined impurity gas has been removed.

One example of a method for manufacturing the sealed container of the first exemplary embodiment will be described.

First, an opening is provided, the opening having a size such that work for disposing gas adsorption device 4 can be carried out. Gas adsorption device 4 is disposed in an inside space of outer container 2 having a chip tube or the like that can be subjected to vacuumization. Thereafter, the opening is sealed, and vacuumization with a vacuum pump is carried out through the chip tube, so as to reduce a pressure of the inside space.

Subsequently, by thermally sealing the chip tube or a like operation, the inside space is formed into sealed space 3, so as to obtain sealed container 1. Herein, an inert gas or the like can be introduced into sealed space 3 as necessary after the pressure of sealed space 3 is reduced and before the chip tube is thermally sealed.

Herein, gas adsorption device 4 is preferably stored in a vacuum pack or a pack filled with an inert gas so that copper ion-exchanged ZSM-5 type zeolite 5 may not be consumed by adsorbing air after production until a time of use. At the time of use, gas adsorption device 4 is taken out from the pack and disposed in sealed space 3 of outer container 2. During a period till sealed space 3 is sealed, gas adsorption device 4 comes into contact with air. When gas adsorption device 4 is a conventional product, copper ion-exchanged ZSM-5 type zeolite 5 adsorbs air components and the like during this period, and a part thereof is consumed. In contrast, in the present exemplary embodiment, copper ion-exchanged ZSM-5 type zeolite 5 is covered with outer container 2 and primary material 6 having a lower gas barrier property than outer container 2 does, so that consumption of copper ion-exchanged ZSM-5 type zeolite 5 is suppressed. This allows that an inherent adsorption capability of copper ion-exchanged ZSM-5 type zeolite 5 can be exhibited. As a result of this, residual air that has not been removed by vacuumization with the vacuum pump is adsorbed and removed by copper ion-exchanged ZSM-5 type zeolite 5 included in gas adsorption device 4. Therefore, a high vacuum state or an inert gas atmosphere having a high purity can be realized in sealed space 3 within sealed container 1.

Next, one example of a method for manufacturing gas adsorption device 4 will be described.

It is sufficient that gas adsorption device 4 includes at least copper ion-exchanged ZSM-5 type zeolite 5 and primary material 6 having a lower gas barrier property than outer container 2 does. Depending on a purpose of use or a need in handling, gas adsorption device 4 may also include container 7 that stores copper ion-exchanged ZSM-5 type zeolite 5 and primary material 6 or another gas adsorption material capable of adsorbing moisture or a specific gas. In addition, each of the primary materials may be subjected to a molding process.

For example, a mode can be used in which container 7 is filled with copper ion-exchanged ZSM-5 type zeolite 5, and primary material 6 having a lower gas barrier property than outer container 2 does is disposed at a site where copper ion-exchanged ZSM-5 type zeolite 5 comes into contact with air in handling gas adsorption device 4 in air.

In addition, copper ion-exchanged ZSM-5 type zeolite 5 may be subjected to tabletting; surroundings of copper ion-exchanged ZSM-5 type zeolite 5 may be covered with primary material 6 having a lower gas barrier property than outer container 2 does; and further a molding process may be carried out.

As will be described later, thermal treatment under a reduced pressure is needed in imparting a gas adsorption activity to copper ion-exchanged ZSM-5 type zeolite 5. Primary material 6 having a lower gas barrier property than outer container 2 does may be disposed before the thermal treatment and subjected to the thermal treatment together with copper ion-exchanged ZSM-5 type zeolite 5, or may be disposed after the thermal treatment. A time of the thermal treatment can be selected according to heat resistance of primary material 6 having a lower gas barrier property than outer container 2 does or a number of manufacturing steps.

Next, constituent members will be described.

First, fabrication of copper ion-exchanged ZSM-5 type zeolite 5 will be described.

Fabrication of copper ion-exchanged ZSM-5 type zeolite 5 is carried out through processes of copper ion-exchange operation, water-washing, drying, and thermal treatment of a commercially available ZSM-5 type zeolite.

The copper ion-exchange operation can be carried out by a known method. A method of immersing a copper ion-exchanged ZSM-5 type zeolite in an aqueous solution of a soluble salt of copper, such as an aqueous solution of copper chloride or an aqueous solution of amino acid copper, is generally employed. Among these, those prepared by a method using a $Cu^{2+}$ solution containing a carboxylato such as copper (divalent) propionate or copper (divalent) acetate have a high gas adsorption activity.

Water-washing of the copper ion-exchanged ZSM-5 type zeolite is sufficiently carried out after the ion-exchange operation.

Subsequently, drying by heating or drying under a reduced pressure is carried out, so as to remove water adhered to a surface of the copper ion-exchanged ZSM-5 type zeolite.

Thereafter, a suitable thermal treatment is carried out under a reduced pressure. This is needed in order to reduce $Cu^{2+}$ introduced by the ion-exchange operation to $Cu^+$ so as to let a gas adsorption capability be exhibited. A pressure at the time of thermal treatment is 10 mPa or less, preferably 1 mPa or less. A temperature at the time of thermal treatment is 300° C. or higher, preferably about 500° C. to about 600° C. so that reduction to $Cu^+$ may proceed.

Copper ion-exchanged ZSM-5 type zeolite 5 imparted with the gas adsorption activity through the above processes has an adsorption activity to a low-molecular-weight gas such as nitrogen, moisture, oxygen, carbon monoxide, carbon dioxide, hydrogen, ethane, or methane.

Meanwhile, copper ion-exchanged ZSM-5 type zeolite 5 having the gas adsorption activity, when handled in air, adsorbs air components and is deactivated. Therefore, after activation by the thermal treatment, a step of fabricating gas adsorption device 4 must be carried out under a reduced pressure or in an inert gas.

Sealed container 1 of the present invention is not particularly designated. However, outer container 2 is required to be a container that can be tightly closed and sealed after gas adsorption device 4 is disposed and that does not allow gas penetration or allows only extremely small gas penetration. Outer container 2 is a container having a gas permeability of about $10^2$ [$cm^3/m^2 \cdot day \cdot atm$] or less, preferably about $10^1$ [$cm^3/m^2 \cdot day \cdot atm$] or less.

Outer container 2 is not particularly designated; however, a container made of glass, a container made of metal, a container made of resin, a container made of a combination of resin and metal, a container made of a combination of resin and glass, a container made of a combination of glass and metal, a bag made of aluminum laminate film, an aluminum pipe whose both tip ends are sealed, or the like can be used as well.

In addition, for example, an electric discharge space of a plasma display, a glove box filled with an inert gas, or the like can be regarded as the sealed container.

Sealed space 3 refers to an inside space after outer container 2 is sealed, and refers to a space which is let to have a high vacuum or from which an impurity gas has been removed at a high degree by gas adsorption device 4.

Primary material 6 having a lower gas barrier property than outer container 2 does refers to a primary material whose gas permeability has a numerical value higher than that of outer container 2. When the gas permeability of outer container 2 is $10^{-2}$ [$cm^3/m^2 \cdot day \cdot atm$], the gas permeability of primary material 6 having a lower gas barrier property than outer container 2 does is $10^{-2}$ [$cm^3/m^2 \cdot day \cdot atm$] or more.

Primary material 6 depends on the gas barrier property of outer container 2, and hence is not particularly designated; however, various organic and inorganic porous bodies, for example, an open-cell porous foam or a ceramic sintered porous body, can be used. In addition, a resin film material having a suitable gas permeability can be used as well. For example, a suitable commercially available film material such as a film made of vinyl chloride or a film made of polypropylene, or a film made of polyethylene can be used. In addition, assemblies made of organic fibers and inorganic fibers, various non-woven cloths, and the like can be used as well.

Primary material 6 is used under a reduced pressure or in an inert gas environment, and hence is preferably a primary material that generates little gas under a reduced pressure.

According to the structure described above, gas adsorption device 4 can be obtained in which consumption of copper ion-exchanged ZSM-5 type zeolite 5 by contact with air is suppressed. As a result of this, the inside of sealed container 1 can be made to have a higher vacuum. Alternatively, sealed container 1 can be provided from which a predetermined impurity gas has been removed.

As described above, sealed container 1 of the present exemplary embodiment includes at least outer container 2 and gas adsorption device 4 being provided in sealed space 3 within outer container 2 and being capable of adsorbing a gas. In addition, gas adsorption device 4 includes at least copper ion-exchanged ZSM-5 type zeolite 5 and primary material 6 having a lower gas barrier property than outer container 2 does.

This allows that, even when copper ion-exchanged ZSM-5 type zeolite 5 having a large gas adsorption volume and having a high gas adsorption speed is brought into contact with air before being applied to an intended use, primary material 6 having a lower gas barrier property than outer container 2 does can retard reach of the air. For this reason, gas adsorption device 4 can be obtained in which consumption of copper ion-exchanged ZSM-5 type zeolite 5 is suppressed. As a result of this, a highly pure state due to removal of the impurity gas can be realized as sealed space 3 in an inside of sealed container 1, or alternatively a sealed container capable of realizing a high vacuum state can be provided.

In addition, the inside of sealed container 1 is in a reduced-pressure state. This allows that, because the inside of sealed container 1 is in a reduced-pressure state, copper ion-exchanged ZSM-5 type zeolite 5 having a large gas adsorption volume within gas adsorption device 4, in which consumption of the gas adsorption material by contact with air is suppressed, can make the inside of sealed container 1 have a higher vacuum.

In addition, gas adsorption device 4 of the present exemplary embodiment is disposed in a container corresponding to outer container 2 and includes copper ion-exchanged ZSM-5 type zeolite 5. In addition, copper ion-exchanged ZSM-5 type zeolite 5 is covered with primary material 6 having a lower gas barrier property than the container does. This allows that, even when copper ion-exchanged ZSM-5 type zeolite 5 having a large gas adsorption volume and having a high gas adsorption speed is brought into contact with air before being applied to an intended use, primary material 6 having a lower gas barrier property than the container does can retard reach of the air. By applying gas adsorption device 4 as described above, a highly pure state due to removal of the impurity gas can be realized in sealed space 3 in the inside of sealed container 1, or alternatively a high vacuum state can be realized.

Second Exemplary Embodiment

Figure 4:
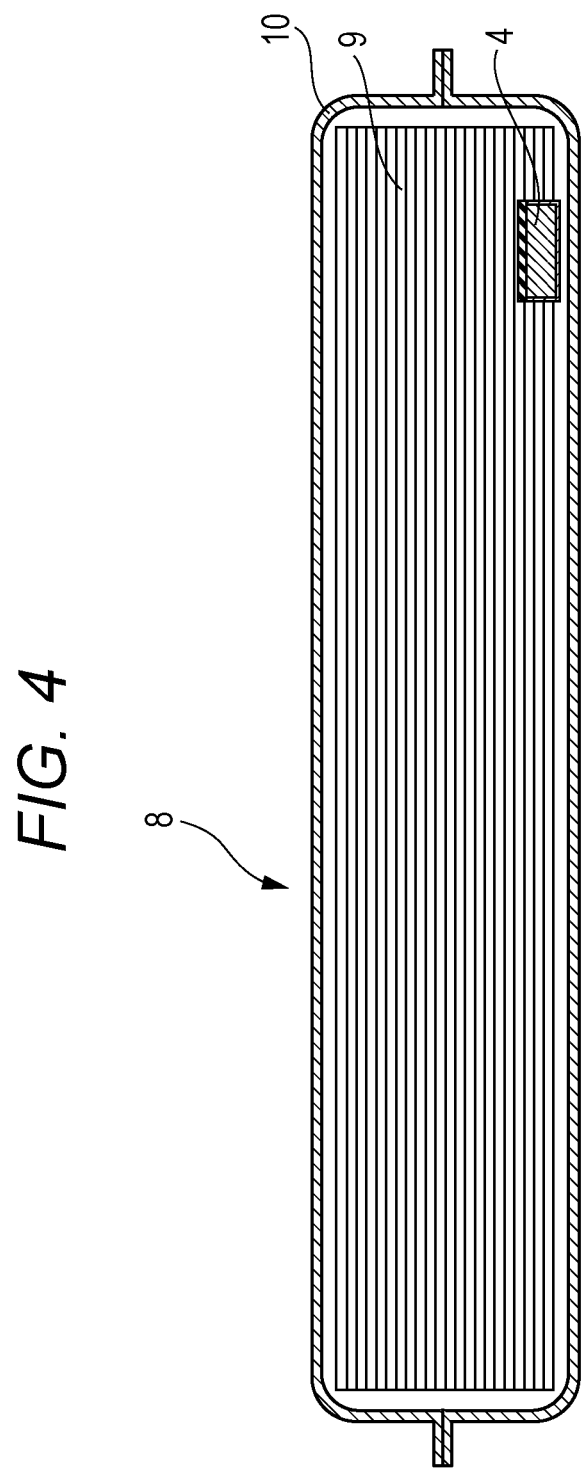
FIG. 4 is a sectional view of a thermal insulator in a second exemplary embodiment of the present invention.
Figure 5:
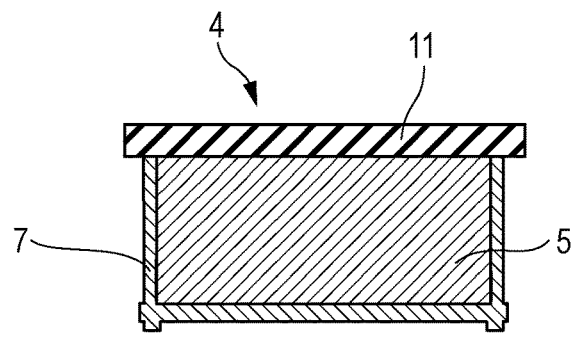
FIG. 5 is a sectional view of one example of a gas adsorption device in the second exemplary embodiment of the present invention.
Figure 6:
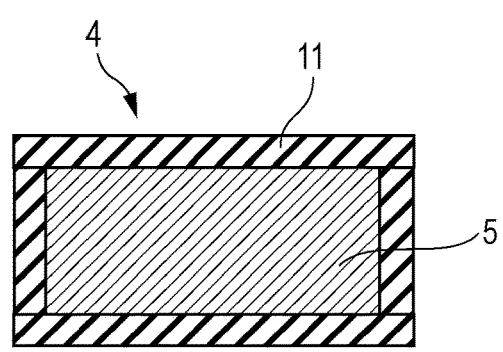
FIG. 6 is a sectional view of another example of the gas adsorption device in the second exemplary embodiment of the present invention.
Figure 7:
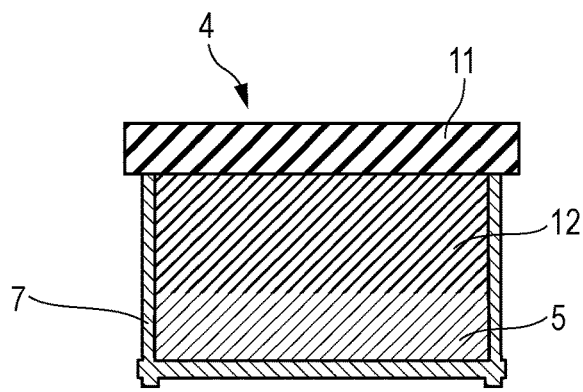
FIG. 7 is a sectional view of still another example of the gas adsorption device in the second exemplary embodiment of the present invention.

FIG. 4 is a sectional view of a thermal insulator in a second exemplary embodiment of the present invention. FIG. 5 is a sectional view of one example of a gas adsorption device in the second exemplary embodiment of the present invention. FIG. 6 is a sectional view of another example of the gas adsorption device in the second exemplary embodiment of the present invention. FIG. 7 is a sectional view of still another example of the gas adsorption device in the second exemplary embodiment of the present invention.

Referring to FIG. 4, thermal insulator 8 of the present exemplary embodiment includes at least core material 9 and gas adsorption device 4 capable of adsorbing a gas, as well as outer covering material 10 having a gas barrier property and covering core material 9 and gas adsorption device 4, a pressure of an inside of outer covering material 10 being reduced. Gas adsorption device 4 includes at least copper ion-exchanged ZSM-5 type zeolite 5 described in the first exemplary embodiment and primary material 11 having a lower gas barrier property than outer covering material 10 does.

In the above-described structure, by covering an air-contact surface of copper ion-exchanged ZSM-5 type zeolite 5 having a large gas adsorption volume and a high gas adsorption speed with primary material 11 having a lower gas barrier property than outer covering material 10 does, reach of air is retarded even when copper ion-exchanged ZSM-5 type zeolite 5 is brought into contact with air before being applied to the thermal insulator. For this reason, gas adsorption device 4 can be obtained in which consumption of copper ion-exchanged ZSM-5 type zeolite 5 by contact with air is suppressed. As a result of this, the pressure in the inside of outer covering material 10 can be reduced, that is, the inside of the thermal insulator can be made to have a higher vacuum. For this reason, a thermal insulator delivering high performance can be provided.

Gas adsorption device 4 to be used may be one similar to that of the first exemplary embodiment. However, particularly in the case of being applied to a thermal insulator, gas adsorption device 4 as shown in FIG. 5 to FIG. 7 is more preferable.

FIG. 5 shows a structure in which container 7 is filled with copper ion-exchanged ZSM-5 type zeolite 5, and a film material serving as primary material 11 having a lower gas barrier property than outer covering material 10 does (hereinafter referred to as film material 11) covers an opening of container 7.

In addition, FIG. 6 shows a structure in which molded copper ion-exchanged ZSM-5 type zeolite 5 is covered with film material 11.

In the structures of FIG. 5 and FIG. 6, primary material 11 is a film material. In these structures, gas adsorption device 4 can be made to have a reduced thickness. As a result of this, the thermal insulator can be made to have a reduced thickness, and an outer appearance is improved.

In addition, FIG. 7 shows a structure in which container 7 is filled with copper ion-exchanged ZSM-5 type zeolite 5 and moisture adsorption material 12 sequentially in an order from container 7 bottom side, and film material 11 covers an opening of container 7.

In the structure of FIG. 7, at least one surface of copper ion-exchanged ZSM-5 type zeolite 5 is covered with moisture adsorption material 12, and at least one surface of moisture adsorption material 12 is covered with film material 11. This allows that, in handling gas adsorption device 4 in air, a layer of moisture adsorption material 12 in addition to outer covering material 10 performs a function of a filter. Therefore, consumption of copper ion-exchanged ZSM-5 type zeolite 5 by adsorption of air before being applied to the thermal insulator can be further suppressed.

In addition, moisture contained in the gas in the inside of outer covering material 10 is adsorbed and removed by moisture adsorption material 12. For this reason, consumption of copper ion-exchanged ZSM-5 type zeolite 5 by adsorption of moisture can be reduced. Copper ion-exchanged ZSM-5 type zeolite 5 can effectively adsorb nitrogen and oxygen which are more hardly adsorbable gases other than moisture.

As a result of this, an amount of applying copper ion-exchanged ZSM-5 type zeolite 5 need not be an amount that is determined by taking consumption by contact with air and consumption by adsorption of moisture into consideration. For this reason, the amount of applying copper ion-exchanged ZSM-5 type zeolite 5 can be reduced.

In addition, when an amount that is determined by taking consumption by contact with air and consumption by adsorption of moisture into consideration is applied as the amount of applying copper ion-exchanged ZSM-5 type zeolite 5, the amount of adsorption of air that penetrates through outer covering material 10 into the inside of the outer covering material with lapse of time increases. For this reason, a reduced-pressure state of the thermal insulator obtained by reducing a pressure in the inside of outer covering material 10 can be maintained for a long period of time. As a result of this, excellent thermal insulation performance can be maintained for a long period of time.

One example of a method for manufacturing a thermal insulator of the second exemplary embodiment will be described.

Core material 9 and gas adsorption device 4 capable of adsorbing a gas are disposed in an inside of outer covering material 10 having a gas barrier property. After a pressure in the inside of outer covering material 10 is reduced by using the inside of a chamber connected to a vacuum pump or the like, an opening of outer covering material 10 is sealed.

Core material 9 to be used may be, for example, an open-cell foam of a polymer material such as polystyrene or polyurethane, an open-cell foam of an inorganic material, an inorganic or organic powder, an inorganic or organic fiber material, or the like. Alternatively, core material 9 may be a mixture of these.

In addition, outer covering material 10 to be used is one having a gas barrier property. For example, various materials and composite materials capable of inhibiting penetration of the gas such as a metal container, a glass container, a gas barrier container obtained by lamination of a resin and a metal, or a laminate film constituted of a surface protection layer, a gas barrier layer, and a thermal fusion layer are used.

Core material 9 and gas adsorption device 4 are inserted into an inside of a bag-shaped laminate film (outer covering material 10) having a thermal fusion layer and being heat-sealed at three sides thereof; the laminate film (outer covering material 10) is connected to a vacuum chamber; and a pressure of the inside of the laminate film (outer covering material 10) is reduced. Under the reduced pressure, an opening of a remaining one side of the laminate film (outer covering material 10) is heat-sealed, whereby gas adsorption device 4 can be fabricated in a simple and convenient manner.

In the present exemplary embodiment, gas adsorption device 4 can be obtained in which consumption of copper ion-exchanged ZSM-5 type zeolite 5 by contact with air can be suppressed even when gas adsorption device 4 is handled in air. As a result of this, an internal pressure of the thermal insulator obtained by reducing a pressure in the inside of outer covering material 10 can be reduced to a further higher vacuum. For this reason, a thermal insulator delivering high performance can be provided.

In addition, at least one surface of copper ion-exchanged ZSM-5 type zeolite 5 may be covered with moisture adsorption material 12, and further at least one surface of moisture adsorption material 12 may be covered with film material 11. This allows that copper ion-exchanged ZSM-5 type zeolite 5 can selectively adsorb only the air from the air containing the moisture in the inside of the thermal insulator. Therefore, gas adsorption with copper ion-exchanged ZSM-5 type zeolite 5 can be carried out more efficiently. For this reason, a thermal insulator delivering excellent thermal insulation performance and having excellent long-term durability with lapse of time can be provided.

Film material 11 to be used may be an organic film or an inorganic film in a form of a thin film having a thickness of about 200 μm or less.

In a case of the organic film, those shown below are used, for example. Polyvinyl chloride, polyethylene, polypropylene, polystyrene, and the like that are generally used, nylon, polyethylene terephthalate, and the like that are referred to as engineering plastics, polyphenylene sulfide, polytetrafluoroethylene, polyvinylidene fluoride, and the like that are referred to as super engineering plastics, and the like are used.

In a case of the inorganic film, a substance in a thin film form mainly containing an inorganic oxide such as silicic acid or alumina, and the like are used.

These films may be a hybrid of an organic film and an inorganic film, or may be one processed into a cloth form or a non-woven cloth form.

As moisture adsorption material 12 of the present exemplary embodiment, a chemical adsorption substance that adsorbs moisture by chemical reaction and a physical adsorption substance that adsorbs moisture by van der Waals force are used. In a case of the chemical adsorption substance, those that adsorb moisture by chemical reaction with moisture, such as calcium oxide and magnesium oxide, are used. In addition, in a case of a physical adsorption substance, porous primary materials such as silica gel, activated carbon, and various olites are used.

Hereinafter, with respect to the second exemplary embodiment of the present invention, results of evaluation performed on thermal insulators including the gas adsorption device, which have been fabricated by varying structures among Example 1 to Example 5, will be shown.

Together with these, Comparative Example 1 and Comparative Example 2 will be shown later.

In the examples and comparative examples, in order to evaluate effects of the gas adsorption device, same constituent members are used except for the gas adsorption device. A manufacturing method is as follows.

A glass wool laminate is used as the core material. An outer covering material obtained by heat-sealing three sides of a laminate film constituted of a nylon film layer, an aluminum foil layer, and a polyethylene layer is used as the outer covering material. The core material and the gas adsorption device are inserted into the outer covering material, and vacuumization is carried out down to 10 Pa in a vacuum chamber. Thereafter, a remaining one side of the outer covering material is heat-sealed, so as to fabricate the thermal insulator.

The gas adsorption device is fabricated in a glove box filled with an inert gas, and is stored after being packed in a laminate bag having a gas barrier property until a time of use. The laminate bag is opened immediately before being applied to the thermal insulator, so that a time of contact with air is set to be about 5 minutes until vacuumization is carried out.

In addition, a size of the thermal insulator is set so as to have a longitudinal side of 900 mm, a lateral side of 300 mm, and a thickness of 5 mm.

On each of the thermal insulators of the examples, evaluation of outer appearance and evaluation of thermal conductivity are carried out.

For the evaluation of outer appearance, a site to which the gas adsorption device is applied is evaluated by eye inspection.

Measurement of thermal conductivity is carried out by using AUTO-LAMBDA manufactured by EKO Instruments Co., Ltd.

In the evaluation of thermal conductivity, measurement of an initial thermal conductivity after fabrication of a thermally insulating material, and evaluation after storing the thermal insulator in a thermostat furnace of 80° C. for 200 days to accelerate an amount of air that penetrates through the outer covering material into the inside of the outer covering material with lapse of time are carried out. In a case of using the outer covering material of the examples in the present invention, storage at 80° C. for 200 days seems to correspond to about 4 years of storage at an ordinary temperature.

The results of the examples and the comparative examples will each be summarized in (Table 1) and (Table 2).

TABLE 1

|  |  | Example 1 | Example 2 | Example 3 | Example 4 | Example 5 |
|---|---|---|---|---|---|---|
| Applied amount of copper ion-exchanged ZSM-5 type zeolite (g) | | 1.5 | ← | ← | ← | ← |
| Kind of primary material having lower gas barrier property than outer covering material does | | Alumina-based ceramic porous body | Polyethylene non-woven cloth | Polyethylene film | Vinyl chloride film | Polyethylene non-woven cloth |
| Application of moisture adsorption material | | Not applied | ← | ← | ← | Applied |
| Result of evaluation | Outer appearance | With problems | Without problems | ← | ← | ← |
| | Thermal conductivity (initial state) | 0.0030 | 0.0034 | 0.0030 | 0.0030 | 0.0030 |
| | Thermal conductivity (after 200 days) | 0.0040 | 0.0044 | 0.0033 | 0.0033 | 0.0030 |

TABLE 2

|  |  | Comparative Example 1 | Comparative Example 2 |
|---|---|---|---|
| Gas adsorption material | | Ba—Li alloy | Copper ion-exchanged ZSM-5 type zeolite |
| Application of moisture adsorption material | | Applied | Not applied |
| Result of evaluation | Outer appearance | Without problems | Without problems |
| | Thermal conductivity (initial state) | 0.0050 | 0.0040 |

TABLE 2-continued

|  | Comparative Example 1 | Comparative Example 2 |
|---|---|---|
| Thermal conductivity (after 200 days) | 0.0045 | 0.0044 |

Example 1

In Example 1, the gas adsorption device has a structure shown in FIG. 2. After a container made of aluminum is filled with 1.5 g of copper ion-exchanged ZSM-5 type zeolite 5 and an alumina-based ceramic porous body serving as primary material 6 having a lower gas barrier property than the outer covering material does, a thermal treatment is carried out at 600° C. under a reduced pressure, so as to fabricate the gas adsorption device. The structure is such that the alumina-based ceramic porous body covers copper ion-exchanged ZSM-5 type zeolite 5.

As a result of evaluation on the thermal insulator fabricated by using this gas adsorption device, the outer appearance is such that a site where the gas adsorption device is disposed is convex as compared to the thickness of a site where the gas adsorption device is not disposed. This is due to a following reason. Because the alumina-based ceramic porous body is disposed to cover copper ion-exchanged ZSM-5 type zeolite 5, the gas adsorption device has a thickness of 6 mm.

Meanwhile, the initial thermal conductivity and the thermal conductivity after 200 days have passed are 0.0030 W/mK and 0.0040 W/mK, respectively, which are lower than those of Comparative Example 1 and Comparative Example 2, and show excellent thermally insulating performance.

In Example 1, by covering an air-contact surface of copper ion-exchanged ZSM-5 type zeolite 5 having a large gas adsorption volume and a high gas adsorption speed with the alumina-based ceramic porous body having a lower gas barrier property than the outer covering material does, the alumina-based ceramic porous body can retard reach of air even when copper ion-exchanged ZSM-5 type zeolite 5 is brought into contact with air before being applied to the thermal insulator. For this reason, a gas adsorption device can be obtained in which consumption of copper ion-exchanged ZSM-5 type zeolite 5 is suppressed. This is an effect produced by setting the internal pressure of the thermal insulator, which is obtained by reducing a pressure in the inside of the outer covering material, to be a higher vacuum.

Example 2

In Example 2, the gas adsorption device has a structure shown in FIG. 5. A container made of aluminum is filled with 1.5 g of copper ion-exchanged ZSM-5 type zeolite 5 that has been subjected to a thermal treatment at 600° C. under a reduced pressure. Thereafter, as primary material 11 having a lower gas barrier property than the outer covering material does, a non-woven cloth film made of polyethylene is disposed to cover copper ion-exchanged ZSM-5 type zeolite 5. In this manner, the gas adsorption device is fabricated.

As a result of evaluation on the thermal insulator fabricated by using this gas adsorption device, the outer appearance is flat and smooth, and is good. This is due to a following reason. Because the non-woven cloth film made of polyethylene is used as primary material 11 having a lower gas barrier property than the outer covering material does, the thickness of the gas adsorption device can be reduced. As a result of this, reduction of the thickness of the thermal insulator can be achieved, and also an outer appearance property can be made good.

The initial thermal conductivity and the thermal conductivity after 200 days have passed are 0.0034 W/mK and 0.0044 W/mK, respectively, which are lower than those of Comparative Example 1 and Comparative Example 2, and show excellent thermally insulating performance.

In Example 2, by covering an air-contact surface of copper ion-exchanged ZSM-5 type zeolite 5 having a large gas adsorption volume and a high gas adsorption speed with the non-woven cloth film made of polyethylene having a lower gas barrier property than the outer covering material does, the non-woven cloth film made of polyethylene can retard reach of air even when copper ion-exchanged ZSM-5 type zeolite 5 is brought into contact with air before being applied to the thermal insulator. For this reason, a gas adsorption device can be obtained in which consumption of copper ion-exchanged ZSM-5 type zeolite 5 is suppressed. This is an effect produced by setting the internal pressure of the thermal insulator, which is obtained by reducing a pressure in the inside of the outer covering material, to be a higher vacuum.

Meanwhile, the thermal conductivity is found to increase as compared with Example 1. This seems to be due to a following reason. Because an air permeability of the non-woven cloth film made of polyethylene is larger than the air permeability of the alumina-based ceramic porous body, copper ion-exchanged ZSM-5 type zeolite 5 adsorbs the air components and the like, and a part thereof is consumed, during a process of manufacturing the thermal insulator.

Example 3

In Example 3, the gas adsorption device has a structure shown in FIG. 5. A container made of aluminum is filled with 1.5 g of copper ion-exchanged ZSM-5 type zeolite 5 that has been subjected to a thermal treatment at 600° C. under a reduced pressure. Thereafter, as primary material 11 having a lower gas barrier property than the outer covering material does, a film made of polyethylene is disposed to cover copper ion-exchanged ZSM-5 type zeolite 5. In this manner, the gas adsorption device is fabricated.

As a result of evaluation on the thermal insulator fabricated by using this gas adsorption device, the outer appearance is flat and smooth, and is good. This is due to a following reason. Because the film made of polyethylene is used as primary material 11 having a lower gas barrier property than the outer covering material does, the thickness of the gas adsorption device can be reduced. As a result of this, reduction of the thickness of the thermal insulator can be achieved, and also an outer appearance property can be made good.

The initial thermal conductivity and the thermal conductivity after 200 days have passed are 0.0030 W/mK and 0.0033 W/mK, respectively, which are lower than those of Comparative Example 1 and Comparative Example 2, and show excellent thermally insulating performance.

In Example 3, by covering an air-contact surface of copper ion-exchanged ZSM-5 type zeolite 5 having a large gas adsorption volume and a high gas adsorption speed with the film made of polyethylene having a lower gas barrier property than the outer covering material does, the film made of polyethylene can retard reach of air even when copper ion-exchanged ZSM-5 type zeolite 5 is brought into contact with air before being applied to the thermal insulator. For this reason, a gas adsorption device can be obtained in which consumption of copper ion-exchanged ZSM-5 type zeolite 5 is suppressed. This is an effect produced by setting the internal pressure of the thermal insulator, which is obtained by reducing a pressure in the inside of the outer covering material, to be a higher vacuum.

Example 4

In Example 4, the gas adsorption device has a structure shown in FIG. 6. Tabletting is carried out on 1.5 g of copper ion-exchanged ZSM-5 type zeolite 5 that has been subjected to a thermal treatment at 600° C. under a reduced pressure. As primary material 11 having a lower gas barrier property than the outer covering material does, a film made of vinyl chloride is used and covers surroundings of copper ion-exchanged ZSM-5 type zeolite 5. In this manner, the gas adsorption device is fabricated.

As a result of evaluation on the thermal insulator fabricated by using this gas adsorption device, the outer appearance is flat and smooth, and is good. This is due to a following reason. Because the film made of vinyl chloride is used as primary material 11 having a lower gas barrier property than the outer covering material does, the thickness of the gas adsorption device can be reduced. As a result of this, reduction of the thickness of the thermal insulator can be achieved, and also an outer appearance property can be made good.

The initial thermal conductivity and the thermal conductivity after 200 days have passed are 0.0030 W/mK and 0.0033 W/mK, respectively, which are lower than those of Comparative Example 1 and Comparative Example 2, and show excellent thermally insulating performance.

In Example 4, by covering an air-contact surface of copper ion-exchanged ZSM-5 type zeolite 5 having a large gas adsorption volume and a high gas adsorption speed with the film made of vinyl chloride having a lower gas barrier property than the outer covering material does, the film made of polyethylene can retard reach of air even when copper ion-exchanged ZSM-5 type zeolite 5 is brought into contact with air before being applied to the thermal insulator. For this reason, a gas adsorption device can be obtained in which consumption of copper ion-exchanged ZSM-5 type zeolite 5 is suppressed. This is an effect produced by setting the internal pressure of the thermal insulator, which is obtained by reducing a pressure in the inside of the outer covering material, to be a higher vacuum.

Example 5

In Example 5, the gas adsorption device has a structure shown in FIG. 7. A container made of aluminum is filled with 1.5 g of copper ion-exchanged ZSM-5 type zeolite 5 that has been subjected to a thermal treatment at 600° C. under a reduced pressure. Thereafter, the container is filled with 4 g of calcium oxide as a moisture adsorption material. As primary material 11 having a lower gas barrier property than the outer covering material does, a non-woven cloth film made of polyethylene is disposed to cover an opening of the container. In this manner, the gas adsorption device is fabricated.

As a result of evaluation on the thermal insulator fabricated by using this gas adsorption device, the outer appearance is flat and smooth, and is good. This is due to a following reason. Because the non-woven cloth film made of polyethylene is used as the primary material having a lower gas barrier property than the outer covering material does, the thickness of the gas adsorption device can be reduced. As a result of this, reduction of the thickness of the thermal insulator can be achieved, and also an outer appearance property can be made good.

The initial thermal conductivity and the thermal conductivity after 200 days have passed are 0.0030 W/mK and 0.0030 W/mK, respectively, which are lower than those of Comparative Example 1 and Comparative Example 2, and show excellent thermally insulating performance.

In Example 5, by covering an air-contact surface of copper ion-exchanged ZSM-5 type zeolite 5 having a large gas adsorption volume and a high gas adsorption speed with the film made of polyethylene having a lower gas barrier property than the outer covering material does, the film made of polyethylene can retard reach of air even when copper ion-exchanged ZSM-5 type zeolite 5 is brought into contact with air before being applied to the thermal insulator. Furthermore, moisture contained in the gas in the inside of the outer covering material is adsorbed and removed by moisture adsorption material 12, so that consumption of copper ion-exchanged ZSM-5 type zeolite 5 by moisture adsorption can be reduced. This is an effect produced by setting the internal pressure of the thermal insulator, which is obtained by reducing a pressure in the inside of the outer covering material, to be a higher vacuum.

In addition, the thermal conductivity after 200 days have passed is lower than those of Examples 1 to 4, and shows excellent thermally insulating performance.

This is because, in addition to the outer covering material, a layer of moisture adsorption material 12 exhibits a function of a filter, and consumption of copper ion-exchanged ZSM-5 type zeolite 5 by adsorption of air before copper ion-exchanged ZSM-5 type zeolite 5 is applied to the thermal insulator can be suppressed to a further extent. For this reason, in Example 5 to which a copper ion-exchanged ZSM-5 type zeolite in an amount equivalent to those of Examples 1 to 4 is applied, the amount of adsorption of air that penetrates through the outer covering material into the inside of the outer covering material with lapse of time increases, and a reduced-pressure state of the thermal insulator obtained by reducing a pressure in the inside of the outer covering material can be maintained for a long period of time. As a result of this, excellent thermally insulating performance can be maintained for a long period of time.

In addition, the gas adsorption device is fabricated in a glove box filled with an inert gas, and is stored after being packed in a laminate bag having a gas barrier property until a time of use. There are cases in which an edge of a metal container made of aluminum or the like that is used in the gas adsorption device injures a laminate pack bag. However, injury to the laminate pack is prevented because the non-woven cloth film made of polyethylene, that is used as primary material 11 having a lower gas barrier property than the outer covering material does, is present between the edge of the metal container and the laminate pack.

Next, comparative examples of the exemplary embodiments of the present invention will be described.

Comparative Example 1

In Comparative Example 1, a gas adsorption device is fabricated by filling a container made of aluminum with 1.5 g of a Ba—Li alloy and thereafter filling the container with 4 g of calcium oxide as a dry material powder (moisture adsorption material) in accordance with PTL 1.

As a result of evaluation on the thermal insulator fabricated by using this gas adsorption device, the outer appearance is flat and smooth, and is good. However, the initial thermal conductivity and the thermal conductivity after 200 days have passed are 0.0050 W/mK and 0.0045 W/mK, respectively, which are higher than those of the examples.

With respect to the initial thermal conductivity, it seems that the capability of the Ba—Li alloy to adsorb nitrogen is comparatively low, and the adsorption speed is slow, so that the residual gas that has not been removed in the vacuum gas-discharging step still remains insufficiently adsorbed and removed at a time of thermal conductivity evaluation.

With respect to the thermal conductivity after 200 days have passed, a structure in which the Ba—Li alloy is covered only with the dry material powder cannot prevent reach of the air to the Ba—Li alloy, so that a part of the Ba—Li alloy is consumed by the air that comes into contact when the thermal insulator is fabricated. As a result of this, the period of time during which the reduced-pressure state of the thermal insulator is maintained seems to be shorter than that of the examples.

Comparative Example 2

In Comparative Example 2, a gas adsorption device is fabricated by filling a container made of aluminum with 1.5 g of a copper ion-exchanged ZSM-5 type zeolite and thereafter performing a thermal treatment at 600° C. under a reduced pressure. The gas adsorption device has a structure in which there is no member that covers the copper ion-exchanged ZSM-5 type zeolite.

As a result of evaluation on the thermal insulator fabricated by using this gas adsorption device, the outer appearance is flat and smooth, and is good. However, the initial thermal conductivity and the thermal conductivity after 200 days have passed are 0.0040 W/mK and 0.0044 W/mK, respectively, which are higher than those of the examples.

A part of the copper ion-exchanged ZSM-5 type zeolite is consumed by the air that comes into contact when the thermal insulator is fabricated. As a result of this, a capability of adsorbing the residual gas that has not been removed in the industrial vacuum gas-discharging step, which is present in the inside of the outer covering material, seems to have decreased.

The structure described above allows that, according to the present exemplary embodiment, a gas adsorption device can be obtained in which consumption of the copper ion-exchanged ZSM-5 type zeolite by contact with air can be suppressed even when the gas adsorption device is handled in air. As a result of this, an internal pressure of the thermal insulator obtained by reducing a pressure in the inside of the outer covering material can be reduced to a further higher vacuum. Therefore, a thermal insulator delivering high performance can be provided.

In addition, at least one surface of the copper ion-exchanged ZSM-5 type zeolite may be covered with a moisture adsorption material, and further at least one surface of the moisture adsorption material may be covered with a film material having a lower gas barrier property than the outer covering material does. This allows that the copper ion-exchanged ZSM-5 type zeolite can selectively adsorb only the air from the air containing moisture in the inside of the thermal insulator. For this reason, gas adsorption with the copper ion-exchanged ZSM-5 type zeolite can be carried out more efficiently. Therefore, a thermal insulator delivering excellent thermal insulation performance and having excellent long-term durability with lapse of time can be provided.

As described above, thermal insulator 8 of the present exemplary embodiment includes at least core material 9 and gas adsorption device 4 capable of adsorbing a gas, as well as outer covering material 10 having a gas barrier property and covering core material 9 and gas adsorption device 4, a pressure of an inside of outer covering material 10 being reduced. In addition, gas adsorption device 4 includes at least copper ion-exchanged ZSM-5 type zeolite 5 and primary material 11 having a lower gas barrier property than outer covering material 10 does.

This allows that, even when copper ion-exchanged ZSM-5 type zeolite 5 having a large gas adsorption volume and a high gas adsorption speed is brought into contact with air before being applied to thermal insulator 8, primary material 11 having a lower gas barrier property than outer covering material 10 does can retard reach of air. For this reason, gas adsorption device 4 can be obtained in which consumption of copper ion-exchanged ZSM-5 type zeolite 5 is suppressed. As a result of this, the internal pressure of thermal insulator 8 formed by reducing the pressure in the inside of outer covering material 10 can be made to be a higher vacuum. Therefore, thermal insulator 8 delivering high performance can be provided.

In addition, primary material 11 may be a film material. This allows that, because primary material 11 having a lower gas barrier property than outer covering material 10 does is the film material, thickness of gas adsorption device 4 can be reduced. As a result of this, thickness of thermal insulator 8 can be reduced. In addition, the outer appearance property of thermal insulator 8 can be improved.

In addition, copper ion-exchanged ZSM-5 type zeolite 5 may be covered with primary material 11. This allows that, because copper ion-exchanged ZSM-5 type zeolite 5 is covered with primary material 11 having a lower gas barrier property than outer covering material 10 does, reach of the gas to copper ion-exchanged ZSM-5 type zeolite 5 can be sufficiently retarded. This eliminates a need to make an amount of applying copper ion-exchanged ZSM-5 type zeolite 5 be an amount that is determined by taking consumption by contact with air into consideration, and the amount of applying copper ion-exchanged ZSM-5 type zeolite 5 can be reduced. In addition, when an amount that is determined by taking consumption by contact with air into consideration is applied as the amount of applying copper ion-exchanged ZSM-5 type zeolite 5, the amount of adsorption of air that penetrates through outer covering material 10 into the inside of outer covering material 10 with lapse of time advantageously increases. For this reason, a reduced-pressure state of thermal insulator 8 obtained by reducing a pressure in the inside of outer covering material 10 can be maintained for a long period of time. As a result of this, excellent thermal insulation performance can be maintained for a long period of time.

In addition, gas adsorption device 4 may include moisture adsorption material 12. This allows that, in handling gas adsorption device 4 in air, primary material 11 having a lower gas barrier property than outer covering material 10 does retards reach of the gas to copper ion-exchanged ZSM-5 type zeolite 5. In addition, moisture contained in the gas in the inside of outer covering material 10 is adsorbed and removed by moisture adsorption material 12. For this reason, consumption of copper ion-exchanged ZSM-5 type zeolite 5 by adsorption of moisture can be reduced. In addition, copper ion-exchanged ZSM-5 type zeolite 5 can effectively adsorb nitrogen and oxygen which are more hardly adsorbable gases other than moisture. As a result of this, an amount of applying copper ion-exchanged ZSM-5 type zeolite 5 need not be an amount that is determined by taking consumption by contact with air and consumption by adsorption of moisture into consideration. For this reason, the amount of applying copper ion-exchanged ZSM-5 type zeolite 5 can be reduced. In addition, when an equivalent amount is applied, the amount of adsorption of air that penetrates through outer covering material 10 into the inside of outer covering material 10 with lapse of time advantageously increases. For this reason, a reduced-pressure state of thermal insulator 8 obtained by reducing a pressure in the inside of outer covering material 10 can be maintained for a long period of time. As a result of this, excellent thermal insulation performance can be maintained for a long period of time.

In addition, at least one surface of copper ion-exchanged ZSM-5 type zeolite 5 may be covered with moisture adsorption material 12, and at least one surface of moisture adsorption material 12 may be covered with primary material 11. This allows that, in handling gas adsorption device 4 in air, moisture adsorption material 12 in addition to outer covering material 10 performs a function of a filter. Therefore, consumption of copper ion-exchanged ZSM-5 type zeolite 5 by adsorption of air before being applied to thermal insulator 8 can be further suppressed. Therefore, thermal insulator 8 delivering excellent thermal insulation performance and being excellent in long-term durability with lapse of time can be provided. In addition, moisture contained in the gas in the inside of outer covering material 10 is adsorbed and removed by moisture adsorption material 12, so that consumption of copper ion-exchanged ZSM-5 type zeolite 5 by adsorption of moisture can be reduced. Therefore, copper ion-exchanged ZSM-5 type zeolite 5 can effectively adsorb nitrogen and oxygen which are more hardly adsorbable gases other than moisture. As a result of this, an amount of applying copper ion-exchanged ZSM-5 type zeolite 5 need not be an amount that is determined by taking consumption by contact with air and consumption by adsorption of moisture into consideration. For this reason, the amount of applying copper ion-exchanged ZSM-5 type zeolite 5 can be reduced. In addition, when an amount that is determined by taking consumption by contact with air and consumption by adsorption of moisture into consideration is applied as the amount of applying copper ion-exchanged ZSM-5 type zeolite 5, the amount of adsorption of air that penetrates through outer covering material 10 into the inside of outer covering material 10 with lapse of time advantageously increases. For this reason, a reduced-pressure state of thermal insulator 8 obtained by reducing a pressure in the inside of outer covering material 10 can be maintained for a long period of time. As a result of this, excellent thermal insulation performance can be maintained for a long period of time.

In addition, gas adsorption device 4 of the present exemplary embodiment may be provided in outer covering material 10 and may include copper ion-exchanged ZSM-5 type zeolite 5. In addition, copper ion-exchanged ZSM-5 type zeolite 5 may be covered with primary material 11 having a lower gas barrier property than outer covering material 10 does. This allows that, even when copper ion-exchanged ZSM-5 type zeolite 5 having a large gas adsorption volume and a high gas adsorption speed is brought into contact with air before being applied to an intended use, primary material 11 having a gas barrier property than outer covering material 10 does can retard reach of air. By applying gas adsorption device 4 as described above, in thermal insulator 8, the internal pressure of thermal insulator 8 formed by reducing the pressure in the inside of outer covering material 10 can be made to be a higher vacuum. For this reason, thermal insulator 8 delivering high performance can be provided.

INDUSTRIAL APPLICABILITY

According to the present invention, it is possible to obtain a gas adsorption device capable of suppressing consumption of the copper ion-exchanged ZSM-5 type zeolite caused by contact with air even when the gas adsorption device is handled in air. As a result of this, a highly pure state due to removal of impurity gases or a high vacuum state can be realized as the sealed space within the sealed container. Therefore, the gas adsorption device can be used for a purpose in which, after an inside of a sealed space is made to be a high vacuum, a specific gas is introduced, and a low impurity gas concentration is attained, such as a plasma display panel or a glove box.

In addition, there is provided a thermal insulator including a gas adsorption device in which gas adsorption can be carried out more efficiently. For this reason, the present invention can be applied to a purpose of use in which a thermal insulator delivering excellent thermal insulation performance and being excellent in long-term durability with lapse of time is demanded, for example, to a thermal insulator of a refrigerator, a heat-retaining cold-retaining container, an automatic vending machine, an electric water heater, an automobile, a railroad vehicle, a housing, or the like.

REFERENCE MARKS IN THE DRAWINGS 1 sealed container
2 outer container
3 sealed space
4 gas adsorption device
5 copper ion-exchanged ZSM-5 type zeolite
6 primary material
7 container
8 thermal insulator
9 core material
10 outer covering material
11 primary material (film material)
12 moisture adsorption material

The invention claimed is:

1. A thermal insulator comprising at least a core material and a gas adsorption device capable of adsorbing a gas, as well as an outer covering material having a gas barrier property and covering the core material and the gas adsorption device, wherein a pressure of an inside of the outer covering material is reduced, the gas adsorption device comprises:
 a layer of copper ion-exchanged ZSM-5 type zeolite,
 a layer of moisture adsorption material, and
 a structure in which the copper ion-exchanged ZSM-5 type zeolite and moisture adsorption material are held, comprising a primary material having a lower gas barrier property than the outer covering material does, the layer of moisture adsorption material is disposed between the copper ion-exchanged ZSM-5 type zeolite and the primary material, and the gas to be adsorbed by the gas adsorption device passes through the structure comprising the primary material and then through the layer of moisture adsorption material before reaching the layer of copper ion-exchanged ZSM-5 type zeolite.

2. The thermal insulator according to claim 1, wherein the primary material is a film material.

* * * * *